United States Patent Office 3,325,549
Patented June 13, 1967

3,325,549
CRYSTALLIZATION OF TRIS(HYDROXY-METHYL)NITROMETHANE
Robert E. Laine, Terre Haute, Ind., assignor to Commercial Solvents Corporation, New York, N.Y., a corporation of Maryland
No Drawing. Filed Oct. 3, 1966, Ser. No. 583,930
9 Claims. (Cl. 260—637)

This invention relates to an improved process for the production of tris(hydroxymethyl)nitromethane, hereinafter designated TN, crystals. In a particular aspect this invention relates to an improved process for the production of TN crystals by crystallizing TN from aqueous solution in the presence of a water-soluble barium-containing compound.

TN is obtained by the reaction of nitromethane and formaldehyde in an aqueous medium in the presence of sodium hydroxide. The TN is recovered from the aqueous solution of reaction by crystallizing TN to form an aqueous slurry of TN crystals, separating the TN crystals from the slurry and drying the separated material. As conventionally recovered, the TN crystals are relatively small and are difficult to separate from the aqueous slurry. In addition, the TN crystals as conventionally recovered often agglomerate during drying and then must be ground to a suitable particle size. Without being limited to any particular theory it is believed that the difficulties encountered in the separation and drying of TN crystals are due principally to the high degree of hygroscopicity of the conventionally recovered TN crystals. The high degree of hygroscopicity is in turn believed to be due principally to the small size of the conventionally recovered TN crystals.

It is an object of the present invention to provide an improved process for the production of TN crystals.

It is a further object of the present invention to provide an improved process for the production of TN crystals of relatively large size and of relatively low hygroscopicity which do not present the problems during separation and drying previously encountered.

Further objects and advantages of the present invention will be apparent from the specification and appended claims.

It has been discovered in accordance with the present invention that by incorporating a small amount of a water-soluble barium-containing compound in the aqueous solution of TN before crystallization that TN crystals of relatively large size are obtained. The thus obtained TN crystals are readily separated from aqueous slurry and do not tend to agglomerate during drying.

Any suitable water-soluble form of barium-containing compound may be used in the present invention. The barium-containing compound must, of course, be compatible with TN; that is, it must not react with or cause decomposition of the TN. Representative water-soluble barium-containing compounds include barium hydroxide, barium nitrate, barium acetate, barium chloride, barium sulfate, and the like. Because of its ready availability and the excellent results obtained therewith barium hydroxide is preferred in the present invention.

A water-soluble barium-containing compound is incorporated into the aqueous solution of TN e.g. by adding to the said solution amounts of water-soluble barium-containing compound sufficient to give the desired results. Generally, amounts of from about 0.0005 to about 1.0 percent by weight and preferably from about 0.005 to about 0.05 percent by weight of water-soluble barium-containing compounds calculated as $Ba(OH)_2 \cdot 8H_2O$, the weights based on the weights of the said solution are employed. While amounts greater than 1.0 percent may be used, there is no advantage in doing so. Amounts less than 0.0005 percent are generally not effective.

In the process of the present invention an aqueous solution of TN, preferably containing in the range of from about 60 to about 95 percent TN by weight based on the weight of the solution, is passed into a suitable crystallizer and crystallization is effected generally at a temperature in the range of from about 10 to about 70° C. and preferably in the range of from about 15 to about 35° C. to provide an aqueous slurry of TN crystals. Suitable crystallizers include crystallizers designed for continuous or batch cooling type crystallization. The crystals from the slurry are separated, preferably by centrifugation, and dried in a suitable dryer at a temperature generally in the range of from about 50 to about 100° C. The liquor from the separation typically contains uncrystallized TN and may be concentrated to a suitable concentration e.g. 60–95 percent TN and recycled to the process. The addition of water-soluble barium-containing compound may be accomplished prior to or subsequent to passing the said solution to the crystallizer.

The invention will be understood more fully by reference to the specific examples. It is understood that the examples are presented for purposes of illustration only and are not intended as a limitation of the invention.

Example 1

To a 1-liter glass kettle equipped with a rotating agitator having wiper blades designed to wipe the sides of the kettle during rotation were charged 400 grams of an aqueous solution containing 304 grams of tris(hydroxymethyl)nitromethane. To the aqueous solution was added 0.05 gram of barium hydroxide in the form of $Ba(OH)_2 \cdot 8H_2O$. The kettle was placed in a water bath having a liquid temperature of 35° C. The temperature of the water bath was lowered at the rate of 6 degrees per hour until a bath temperature of 22° C. was reached. Agitation of the contents was maintained throughout the cooling period. An aqueous slurry containing tris(hydroxymethyl)nitromethane crystals was obtained. 86.2 grams of tris(hydroxymethyl)nitromethane crystals of relatively large size and having a relatively low degree of hygroscopicity were separated from the slurry by centrifugation. Drying of the crystals is accomplished without agglomeration.

Example 2

To a 1 liter glass kettle equipped with a rotating agitator having wiper blades designed to wipe the sides of the kettle during rotation were charged 870 grams of an aqueous solution containing 670 grams of tris(hydroxymethyl)nitromethane. To the aqueous solution was added 0.11 gram of barium hydroxide in the form of $Ba(OH)_2 \cdot 8H_2O$. The kettle was placed in a water bath having a temperature of 35° C. The temperature of the water bath was lowered at the rate of 6 degrees per hour until a bath temperature of 22° C. was reached. Agitation of the contents was maintained throughout the period. An aqueous slurry containing tris(hydroxymethyl)nitromethane crystals was obtained. 129.7 grams of tris(hydroxymethyl)nitromethane crystals of relatively large size and having a relatively low degree of hygroscopicity were separated from the slurry by centrifugation. The mother liquor of separation was concentrated under vacuum to 488 milliliters. The concentrated mother liquor was then placed in the above-described kettle and the crystallization procedure was repeated. An aqueous slurry containing tris(hydroxymethyl)nitromethane crystals was obtained. 108.9 grams of tris(hydroxymethyl)nitromethane crystals of relatively large size and having a relatively low degree of hygroscopicity were separated from the slurry by centrifugation. Drying of the crystals obtained in this example is accomplished without agglomeration.

*Example 3*

To a 1-liter glass kettle equipped with a rotating agitator having wiper blades designed to wipe the sides of the kettle during rotation were charged 400 grams of an aqueous solution containing 300 grams of tris(hydroxymethyl)nitromethane. To the aqueous solution was added 0.1 gram of barium nitrate. The kettle was placed in a water bath having a liquid temperature of 35° C. The temperature of the bath was lowered at the rate of 6 degrees per hour until a bath temperature of 27° was reached. Agitation of the contents was maintained throughout the cooling period. An aqueous slurry containing tris(hydroxymethyl)nitromethane crystals was obtained. 72.8 grams of tris(hydroxymethyl)nitromethane crystals of relatively large size and having a relatively low degree of hydroscopicity were separated from the slurry by centrifugation. Drying of the crystals is accomplished without agglomeration.

*Example 4*

The procedure of Example 3 is repeated in all essential details with the exception that barium chloride is substituted for barium nitrate. Tris(hydroxymethyl)nitromethane crystals of relatively large size and having a relatively low degree of hygroscopicity are obtained.

*Example 5*

The procedure of Example 3 is repeated in all essential details with the exception that barium acetate is substituted for barium nitrate. Tris(hydroxymethyl)nitromethane crystals of relatively large size and having a relatively low degree of hygroscopicity are obtained.

*Example 6*

The procedure of Example 3 is repeated in all essential details with the exception that barium sulfate is substituted for barium nitrate. Tris(hydroxymethyl)nitromethane crystals of relatively large size and having a relatively low degree of hygroscopicity are obtained.

Since many embodiments of this invention may be made and since many changes may be made in the embodiments described, the foregoing is interpreted as illustrative only and the present invention is defined by the appended claims.

I claim:
1. In a improved process for the production of tris(hydroxymethyl)nitromethane crystals by crystallizing tris(hydroxymethyl)nitromethane from an aqueous solution of tris(hydroxymethyl)nitromethane to form an aqueous slurry of tris(hydroxymethyl)nitromethane crystals and separating said crystals from said slurry the improvement which comprises carrying out the crystallization in the presence of a water-soluble barium-containing compound.

2. In an improved process for the production of tris(hydroxymethyl)nitromethane crystals by crystallizing tris(hydroxymethyl)nitromethane from an aqueous solution comprising water and from about 60 to about 95 percent by weight of tris(hydroxymethyl)nitroxymethane, the weight based on the weight of the solution, at a temperature in the range of from about 10 to about 70° C. to form an aqueous slurry of tris(hydroxymethyl)nitromethane crystals and separating said crystals from said slurry the improvement which comprises carrying out the crystallization in the presence of a small amount of a water-soluble barium-containing compound.

3. The process of claim 2 wherein the amount of water-soluble barium-containing compound calculated as $Ba(OH)_2 \cdot 8H_2O$ is in the range from about 0.0005 to about 1.0 percent by weight based on the weight of the solution.

4. The process of claim 3 wherein the amount of water-soluble barium-containing compound is in the range of from about 0.005 to about 0.05 percent by weight.

5. The process of claim 2 wherein the water-soluble barium-containing compound is barium hydroxide.

6. The process of claim 2 wherein the water-soluble barium-containing compound is barium nitrate.

7. The process of claim 2 wherein the water-soluble barium-containing compound is barium chloride.

8. The process of claim 2 wherein the water-soluble barium-containing compound is barium sulfate.

9. The process of claim 2 wherein the water-soluble barium-containing compound is barium acetate.

References Cited

UNITED STATES PATENTS 2,250,255  7/1941  Cox _____ 260—637 X
2,250,256  7/1941  Cox _____ 260—637 X

CARL D. QUARFORTH, *Primary Examiner.*

L. A. SEBASTIAN, *Assistant Examiner.*